(No Model.) 2 Sheets—Sheet 1.
T. C. & A. E. WILDER.
COTTON CUPPER.
No. 411,913. Patented Oct. 1, 1889.
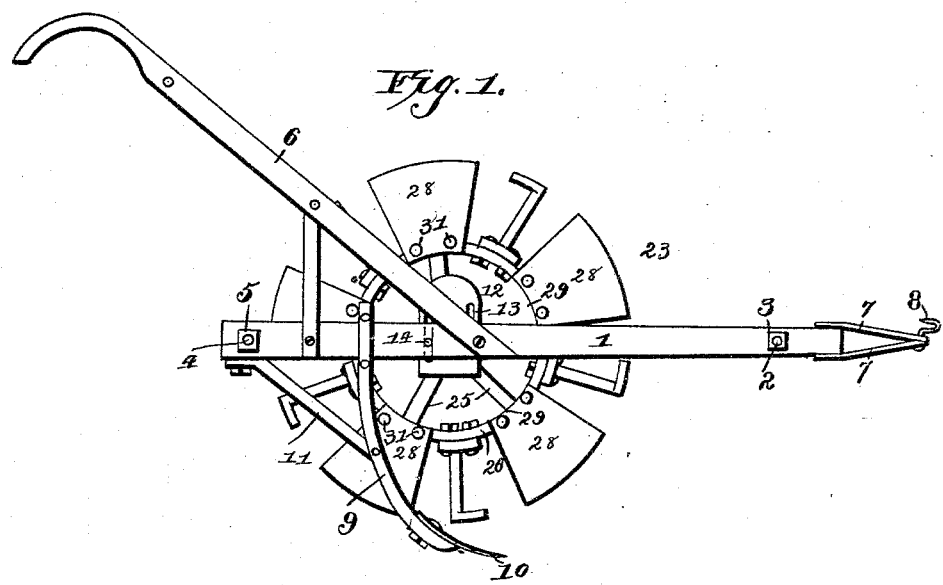
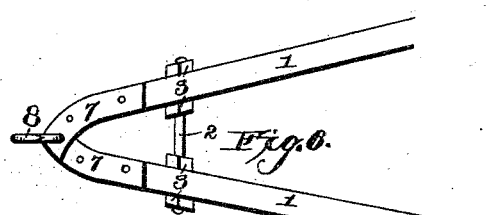
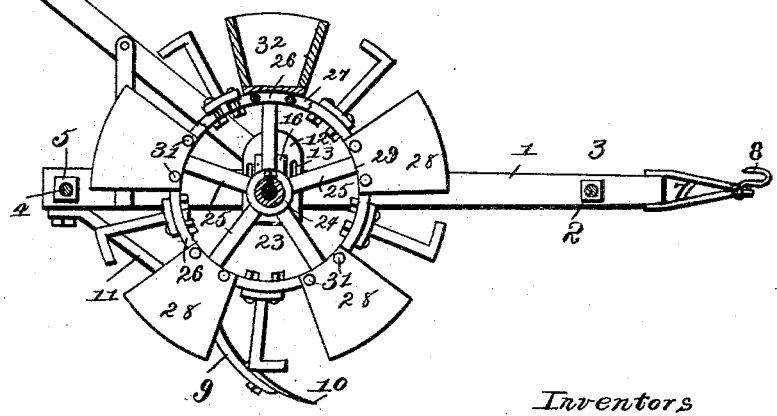
Witnesses:
Henry J. Dietrich
W. S. Luvall
Inventors
Theodore C. Wilder and
Atwood E. Wilder
By their Attorneys (No Model.) T. C. & A. E. WILDER. 2 Sheets—Sheet 2.
COTTON CUPPER.
No. 411,913. Patented Oct. 1, 1889.
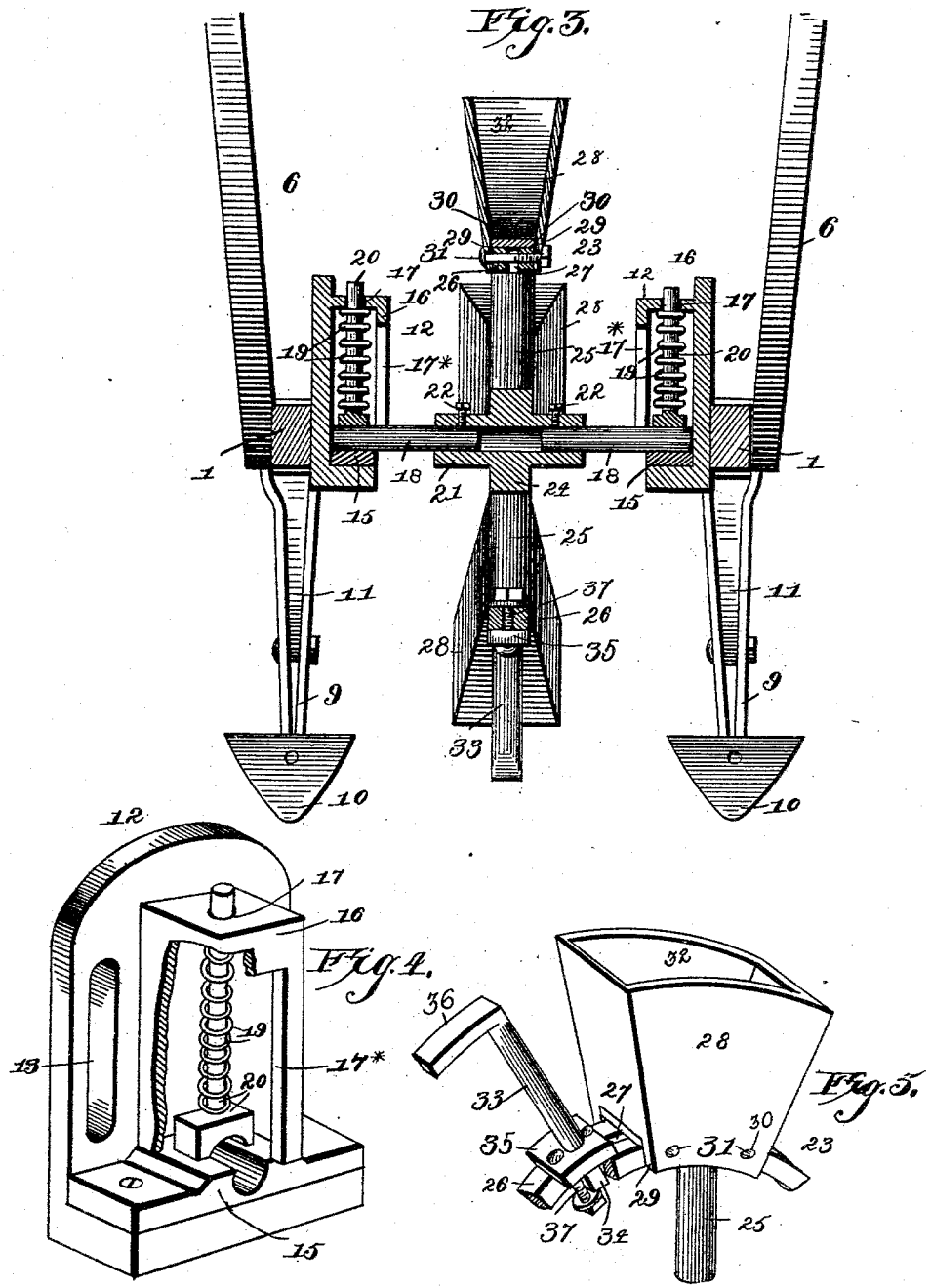
Witnesses:
Henry G. Dietrich
Inventors
Theodore C. Wilder and
Atwood E. Wilder
By their Attorneys

UNITED STATES PATENT OFFICE.

THEODORE C. WILDER, OF HUBER, TEXAS, AND ATWOOD E. WILDER, OF HOMER, LOUISIANA.

COTTON-CUPPER.

SPECIFICATION forming part of Letters Patent No. 411,913, dated October 1, 1889.

Application filed May 15, 1889. Serial No. 310,893. (No model.)

*To all whom it may concern:*

Be it known that we, THEODORE C. WILDER, of Huber, in the county of Shelby and State of Texas, and ATWOOD E. WILDER, of Homer, in the parish of Claiborne, State of Louisiana, have invented a new and useful Cotton-Cupper, of which the following is a specification.

This invention has relation to an improvement in what we have herein termed "cottoncuppers," by which is meant to cup or protect that portion of cotton-plants commonly termed the "stand" during the operation of cultivating and covering up the remainder of the plant or that portion thereof occurring between the stands.

The object and advantages of the invention, together with their novel features, will hereinafter appear, and be more particularly pointed out in the claims.

Referring to the drawings, Figure 1 represents a side elevation of a cotton-cupper constructed in accordance with our invention. Fig. 2 is a central vertical section. Fig. 3 is a central transverse section. Fig. 4 is a detail perspective of one of the bearing-boxes, portions being broken away to expose the interior; and Fig. 5 is a detail in perspective of a portion of the cupping-wheel, showing the manner of connecting the cuppers. Fig. 6 is a detail in plan, illustrating the manner of connecting the two beams.

Like numerals of reference indicate like parts in all the figures of the drawings.

1 1 represent the opposite side plow-beams, which are arranged so that their front ends tend toward each other, and are spaced apart at said ends by means of a space-bolt 2, carrying opposite beam-embracing nuts 3. The rear end of the frame is likewise spaced apart by means of a space rod or bolt 4, having opposite beam-embracing nuts 5. From each of the beams there projects an ordinary cultivator-handle 6, attached to the beam in the usual manner. From the front end of each beam there projects an inwardly-curved draft-arm 7, provided with perforations, through which is passed a bent swiveled clevis 8. Upon each of the beams 1 there is adjustably mounted a depending curved cultivator-standard 9, having a cultivator-tooth at its lower end 10, and diagonal rear braces 11, all as usually constructed.

At a suitable point upon the inner side of each of the beams we locate L-shaped brackets 12, which are provided with vertical slots 13 near each of its opposite edges, through which are inserted set-bolts 14, that pass into the beam. Upon the lower or L-shaped portion of the bracket is mounted a bearing-plate 15, and above the same a boxing 16, the upper end of which is perforated, as at 17, and the front wall of which is longitudinally slotted, as at 17*. Within the boxing and resting upon the bearing-plates are opposite journals or shafts 18, upon which bear bearing-plates having coiled springs 19, said springs being maintained in a vertical position by means of guide-pins 20, extending through the perforations in the upper ends of the boxes. The shafts 18 do not extend entirely across from one beam to the other, but are connected by means of a sleeve 21, having set-screws 22 near each end adapted to bear upon the shafts.

23 represents what we have termed a "cupping-wheel;" the same consists of a hub portion 24, rigidly secured to the sleeve, or it may be cast thereon, from which radiate ordinary spokes 25, carrying a double rim 26—that is to say, the rim consists of two sections spaced apart, thereby forming an intermediate space 27.

28 represents the cups, which are adapted to take over the stand of the cotton, and are of such size and shape interiorly as best adapted for the purpose in view. At intervals upon the rim and in accordance with the relative distance between the stands we mount the cups, the two opposite sides of which are formed with flanges 29, which embrace the rims and are provided with perforations 30, through which pass set-screws or bolts 31, whereby the cups are maintained in an adjusted position upon the wheel. The outer edges of the cups are preferably slightly curved, in accordance with the diameter of the wheel, and the interiors of said cups are provided with internal recesses 32, to receive the stands.

In order to complete the outer circumference of the cupping-wheel as formed by the outer edges of the cups, we mount between the two rims and intermediate each of the cups, legs, or spokes 33. These spokes consist of a tenon portion 34, designed to take between the rims, a square bearing portion 35, and an opposite bent foot portion 36, curved in the same plane as are the edges of the cups, and through the plates are passed binding-bolts 37, which take under the rim of the wheel.

It will be noticed that the relative location of the cultivator teeth and cups is such that as the point of the tooth begins to throw dirt slightly in rear of a stand an adjacent cup has covered that rear portion and revolves always slightly in advance of the teeth, keeping the stand securely covered until the teeth have entirely passed. By reason of the yielding manner of mounting the shafts the cupping-wheel will ride lightly over any obstruction—such as a stump, stone, or mound—and will always fit snugly over the stand, thus preventing any liability of its being covered by the cultivator. The grass and that portion of the cotton overturned by the cultivator-teeth will take intermediate the stands and serve as a fertilizer for the same, and in this manner a regular and predetermined row of cotton-stands may be formed by simply mounting more or less of the cups upon the wheels. If it be desired to bring the stands close together, the number of cups is increased, and if it is desired to decrease the number of stands and have them farther apart the number of cups is decreased. By adjusting the opposite beams and the shafts of the cupping-wheel proportionately the cultivator-teeth will be disposed farther apart or nearer together, and thereby the distance between the rows of stands increased or diminished. It is also apparent that by simply removing the brackets from the beams or by removing the cupping-wheel from the brackets the plow-beams may be contracted or brought closer together, so that the apparatus may be used as an ordinary cultivator.

Having thus described our invention, what we claim is—

1. The combination of cultivator-beams provided with opposite adjustable brackets secured thereto, and provided with yielding bearings mounted in the brackets, of a transverse shaft mounted in the bearings, and a cupping-wheel mounted on the shaft, substantially as specified.

2. In a machine of the class described, a cupping-wheel consisting of a hub and rim, the latter provided with circumferential slots and with cups mounted in the slots, and intermediate legs or spokes also mounted in the slots, the cups and the spokes being adjustable and having their outer extremities curved upon the same radius, substantially as specified.

3. The combination, with opposite beams provided with opposite bearings, of opposite shafts mounted in the bearings, a sleeve connecting the shafts, a wheel mounted on the sleeve, and adjustable cups mounted on the wheel, substantially as specified.

4. The cupping-wheel consisting, essentially, of the hub 24 and spokes 25, the double rim 26, having space 27, the cups 28, secured to the rim by flanges 29, and bolts and nuts, and the intermediate arms 33, having the curved foot 36, and also secured to the rim by tenons inserted in the space 27 and held by nuts, as set forth.

5. The beams having the spring-actuated bearing-blocks, the separate opposite shafts or axles mounted in the said blocks, the sleeve connecting the inner ends of the separate shafts, and the cupping-wheel mounted on the sleeve, as set forth.

6. The beams having the adjustable brackets 12, forming bearings and having spring-actuated bearing-blocks carried thereby, combined with the cupping-wheel, having its shaft or axle mounted in the brackets and held down by the bearing-blocks, as set forth.

In testimony that we claim the foregoing as our own we have hereto affixed our signatures in presence of two witnesses.

THEODORE C. WILDER.
ATWOOD E. WILDER.

Witnesses:
B. F. BRIDGES,
BOB PARKER,
W. J. MERCER,
MARTIN NASH.